United States Patent [19]

Okubo

[11] Patent Number: 5,148,368
[45] Date of Patent: Sep. 15, 1992

[54] ANTI-LOCK CONTROL SYSTEM FOR MOTOR VEHICLES

[75] Inventor: Satomi Okubo, Kuki, Japan

[73] Assignee: Akebono Brake Industry Co., Ltd., Tokyo, Japan

[21] Appl. No.: 564,733

[22] Filed: Aug. 8, 1990

[30] Foreign Application Priority Data

Aug. 8, 1989 [JP] Japan .................................. 1-203827

[51] Int. Cl.$^5$ .............................................. B60T 8/58
[52] U.S. Cl. .............................. 364/426.02; 303/100; 303/103
[58] Field of Search ............... 364/426.01, 426.02; 303/95, 100, 103, 105

[56] References Cited

U.S. PATENT DOCUMENTS

| 4,717,209 | 1/1988 | Hagiya et al. ........................ 303/111 |
| 4,773,714 | 9/1988 | Shimanuki et al. .................. 303/108 |
| 4,807,133 | 2/1989 | Shimanuki et al. ............. 364/426.02 |
| 4,883,325 | 11/1989 | Shimanuki et al. ................... 303/96 |
| 4,991,910 | 2/1991 | Shimanuki et al. ................. 303/109 |

Primary Examiner—Thomas G. Black

[57] ABSTRACT

In an anti-lock control system for a motor vehicle, the design is made such that when the motor vehicle is running on a rough road, it is detected that the motor vehicle is running on rough road, on the basis of which the amount of reduction of brake hydraulic pressure is restricted, thereby making it possible to shorten the braking distance of the motor vehicle.

7 Claims, 5 Drawing Sheets

ANTI-LOCK CONTROL SYSTEM FOR MOTOR VEHICLES

BACKGROUND OF THE INVENTION

1. Field of the Invention

This invention relates to a novel and improved anti-lock control system for motor vehicles, which is operative to prevent the wheels of the motor vehicle from being locked during braking operation of the motor vehicle.

2. Description of the Prior Art

Generally, with an anti-lock control system for motor vehicles, anti-lock control is effected by means of microcomputers such that hold valves and decay valves comprising electromagnetic valves are opened and closed on the basis of electrical signals representing wheel speeds sensed by wheel speed sensors, thereby increasing, holding or reducing the brake hydraulic pressure, for the purpose of securing improved steering performance and running stability of the motor vehicle, while at the same time shortening the braking distance.

FIG. 1 of the accompanying drawings illustrate, by way of example, manners in which wheel speed Vw, wheel acceleration and deceleration dVw/dt and brake hydraulic pressure Pw are varied during the operation of the conventional anti-lock control system, together with hold signal HS and decay signal DS for opening and closing hold valves and decay valves, as disclosed in U.S. Pat. No. 4,741,580.

When the brake equipment of the motor vehicle is not being operated while the motor vehicle is running, the hold valves remain open while the decay valves remain closed, the brake hydraulic pressure Pw is not increased; and when the brake equipment is operated, the brake hydraulic pressure Pw is rapidly increased at time t0 so that the wheel speed Vw is decreased (normal mode). A reference wheel speed Vr is set up which is lower by a predetermined amount $\Delta V$ than the wheel speed Vw and follows the latter with such a speed difference. More specifically, reference wheel speed Vr is set up so that when the deceleration (negative acceleration) dVw/dt of the wheel reaches a predetermined threshold level, say $-1.1$ G at time t1, anti-lock control is started, and the reference wheel speed Vr is thereafter made to linearly decrease with a deceleration gradient $\theta$ ($=-1.1$ G). At time t2 when the deceleration dVw/dt of the wheel reaches a predetermined maximum value $-Gmax$, the hold signal HS is generated so that the hold valves are closed, thus holding the brake hydraulic pressure Pw.

With the brake hydraulic pressure Pw being held, the wheel speed Vw is further decreased. At time t3, the wheel speed Vw and the reference wheel speed Vr become equal to each other, and the decay signal DS is generated, by which the decay valves are opened so that reduction of the brake hydraulic pressure Pw is started. As a result of this reduction of the brake hydraulic pressure Pw, the wheel speed Vw is changed from increase to decrease at time t4 when a low peak VL of the wheel speed Vw occurs. The decay signal DS is interrupted either at the time t4 or at time t5 that is a time point when the wheel speed Vw is increased up to the level of a speed Vb that is higher than the low peak speed VL by 15% of the difference Y between wheel speed Va occurring at the time t3 when the reduction of the brake hydraulic pressure was started and the low peak speed VL, i.e., $Vb = VL + 0.15Y$ FIG. 1 shows the case where the decay signal DS is interrupted at the time t4). Thus, the decay valves are closed so that the reduction of the brake hydraulic pressure Pw is stopped and thus the brake hydraulic pressure is held. The wheel speed Vw is further increased up to the level of a speed Vc that is higher than the low peak speed VL by 80% of the difference Y between the wheel speed Va occurring at the time t3 when the reduction of the brake hydraulic pressure Pw was started and the low peak speed VL, i.e., $Vc = VL + 0.8Y$.

Subsequently, at time t7, a high peak VH of the wheel speed Vw is reached; thereupon the brake hydraulic pressure Pw is again increased. Practically, the high peak VH of the wheel speed Vw is detected in the following manner: The highest one of the four wheel speeds of the vehicle is selected ("select high"); a speed having the acceleration/deceleration of the highest wheel speed limited in the range of $\pm 1$ G is computed as computed vehicle speed Vv; and when the wheel speed Vw reaches a value that is lower than the computed vehicle speed by a predetermined small amount before a high peak of the wheel speed Vw is actually reached, it is judged that the high peak VH of the wheel speed Vw is reached, whereupon buildup of the brake hydraulic pressure is started. In this case, the buildup of the brake hydraulic pressure Pw is effected in such a manner that the brake hydraulic pressure Pw is alternately increased and held in succession by the fact that the hold signal HS is turned on and off mincingly, or with relatively short intervals so that the brake hydraulic pressure Pw is caused to gradually build up. In this way, the wheel speed Vw is decreased, and at time t8 (corresponding to the time t3, a second cycle of the mode for reduction of the brake hydraulic pressure occurs. An initial brake hydraulic pressure buildup occurs at time t7; the time period Tx of the initial brake hydraulic pressure buildup is determined on the basis of calculation of the average acceleration $(Vc - Vb)/\Delta T$ over the time interval $\Delta T$ between the time t5 and the time t6 (the average acceleration depends on the friction coefficient $\mu$ of the road surface); and the time period of the subsequent pressure holding or pressure buildup is determined on the basis of the acceleration or deceleration of the wheel which is detected immediately prior to the pressure holding or pressure buildup. The brake hydraulic pressure increasing, holding and reducing modes are effected in combination as mentioned above; thus, the wheel speed Vw can be controlled so that the vehicle speed can be decreased, while the wheels of the motor vehicle are prevented from being locked.

When the motor vehicle is running on a rough road, it frequently happens that the wheels thereof are caused to float in the air. In such a state, if the brake equipment of the vehicle is being operated, wheels floating in the air will be rapidly decelerated; and when caused to land on the road again, those wheels start rotation again so that changes in the wheel speeds turn out to be different from those which occur when the vehicle is running on a normal road. More specifically, when the vehicle is running on a rough road, the cycle of the anti-lock control turns out to be faster than when the vehicle is running on a normal road, and the amplitude of the wheel speed Vw also becomes greater.

The conventional anti-lock control system is disadvantageous in that in case slow or quick braking is applied when the motor vehicle is running on a rough road, reduction of brake hydraulic pressure will be frequently started due to changes in the wheel speeds so that the brake hydraulic pressure will be prevented from building up, as a result of which the braking distance will be increased.

SUMMARY OF THE INVENTION

Accordingly, it is an object of the present invention to provide an anti-lock control system for a motor vehicle, which is so designed that when the motor vehicle is running on a rough road, it is detected that the motor vehicle is running on rough road, on the basis of which the amount of reduction of brake hydraulic pressure is restricted, thereby making it possible to shorten the braking distance of the motor vehicle.

The anti-lock control system according to the present invention comprises means for making judgment as to whether or not the motor vehicle is running on a rough road; and means adapted, when it is judged by the rough-road judging means that the motor vehicle is running on a rough road, to make, in response thereto, the reduction gradient of the brake hydraulic pressure lower than that for the case where rough-road judgment is not made.

The anti-lock control system according to the present invention further comprises means for computing a computed vehicle speed Vv proximate to the actual vehicle speed on the basis of four wheel speeds representing rotating speeds of the four wheels of the motor vehicle respectively; and threshold value computing means for computing a threshold value VT1 which follows the computed vehicle speed Vv with a predetermined speed difference $\Delta V1$ (VT1=Vv−$\Delta V1$). The aforementioned rough-road judging means includes means for detecting a time point when the wheel speed as increasing or decreasing passes the above-mentioned threshold value; time measuring means for measuring the time period from a time point when the wheel speed as increasing or decreasing passes the threshold value VT1 to a time point when the wheel speed as increasing or decreasing passes the threshold value VT1 again; and means for comparing the time period $\Delta T$ measured by the time measuring means with a predetermined time period and adapted, when $\Delta T$ becomes equal to or shorter than the predetermined time period T, to provide a rough-road judgment signal.

Reduction of the brake hydraulic pressure is effected by the decay valve being opened and closed mincingly, i.e., with relatively short intervals by decay signal consisting of pulse signal. The means for making the reduction gradient of the brake hydraulic pressure lower when rough-road judgment is made, is arranged to make such reduction gradient lower by increasing the pulse interval of the decay signal for example.

As will be appreciated from the above discussion, according to the present invention, the reduction gradient of the brake hydraulic pressure is made to be lower when the motor vehicle is running on a rough road than when the motor vehicle is running on a non-rough road; thus, it is possible to avoid such a tendency that reduction of the brake hydraulic pressure is frequently started due to abrupt changes in the wheel speed Vw so that the brake hydraulic pressure becomes short when the motor vehicle is running on a rough road. In this way, it is possible to secure adequate braking force even when the motor vehicle is running on a rough road.

DESCRIPTION OF THE PREFERRED EMBODIMENTS

The preferred embodiments of the present invention will now be described in detail with reference to the accompanying drawings.

Figure 1:
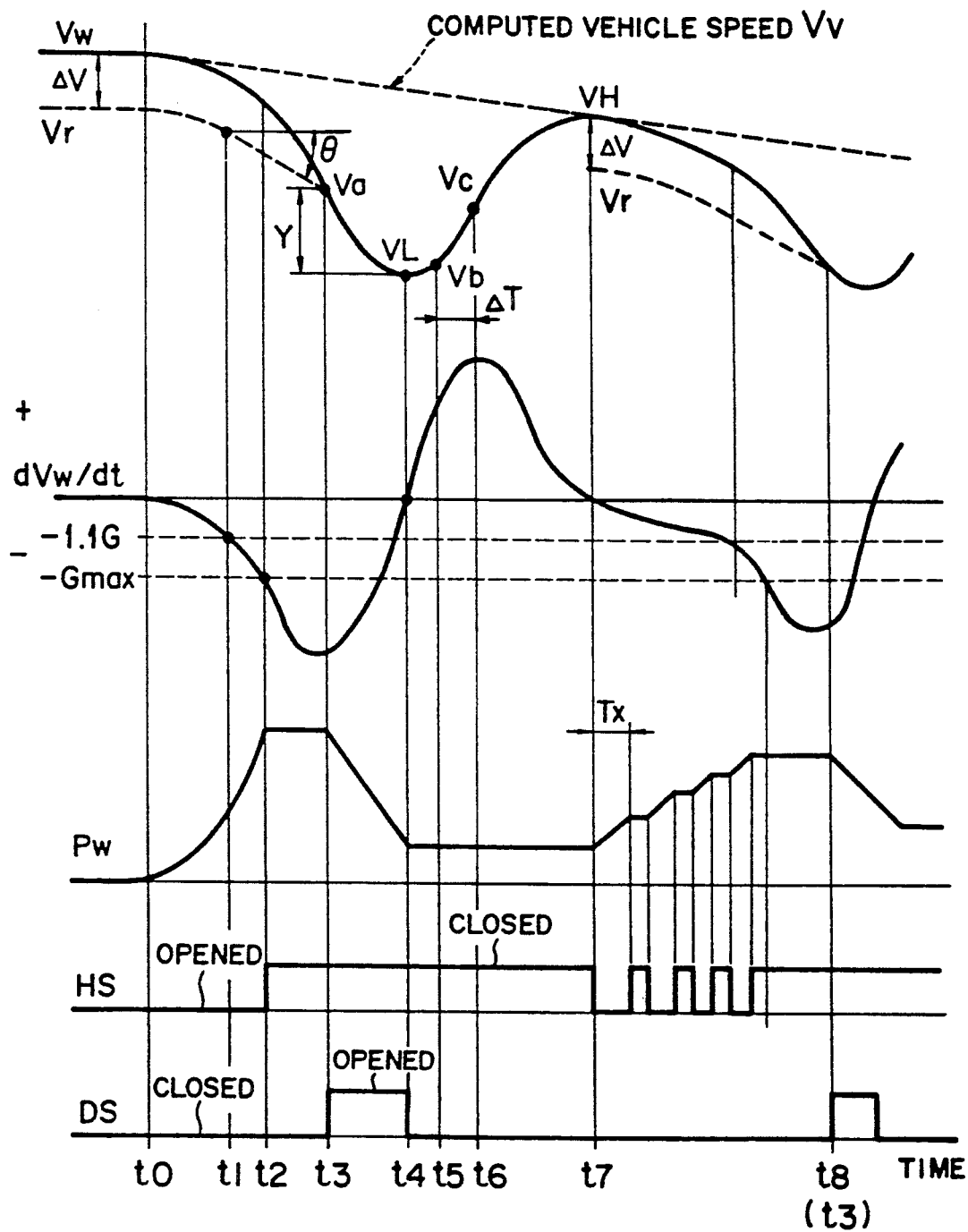
FIG. 1 is a view useful for explaining how anti-lock control is effected with the prior-art anti-lock control system for motor vehicles.
Figure 2:
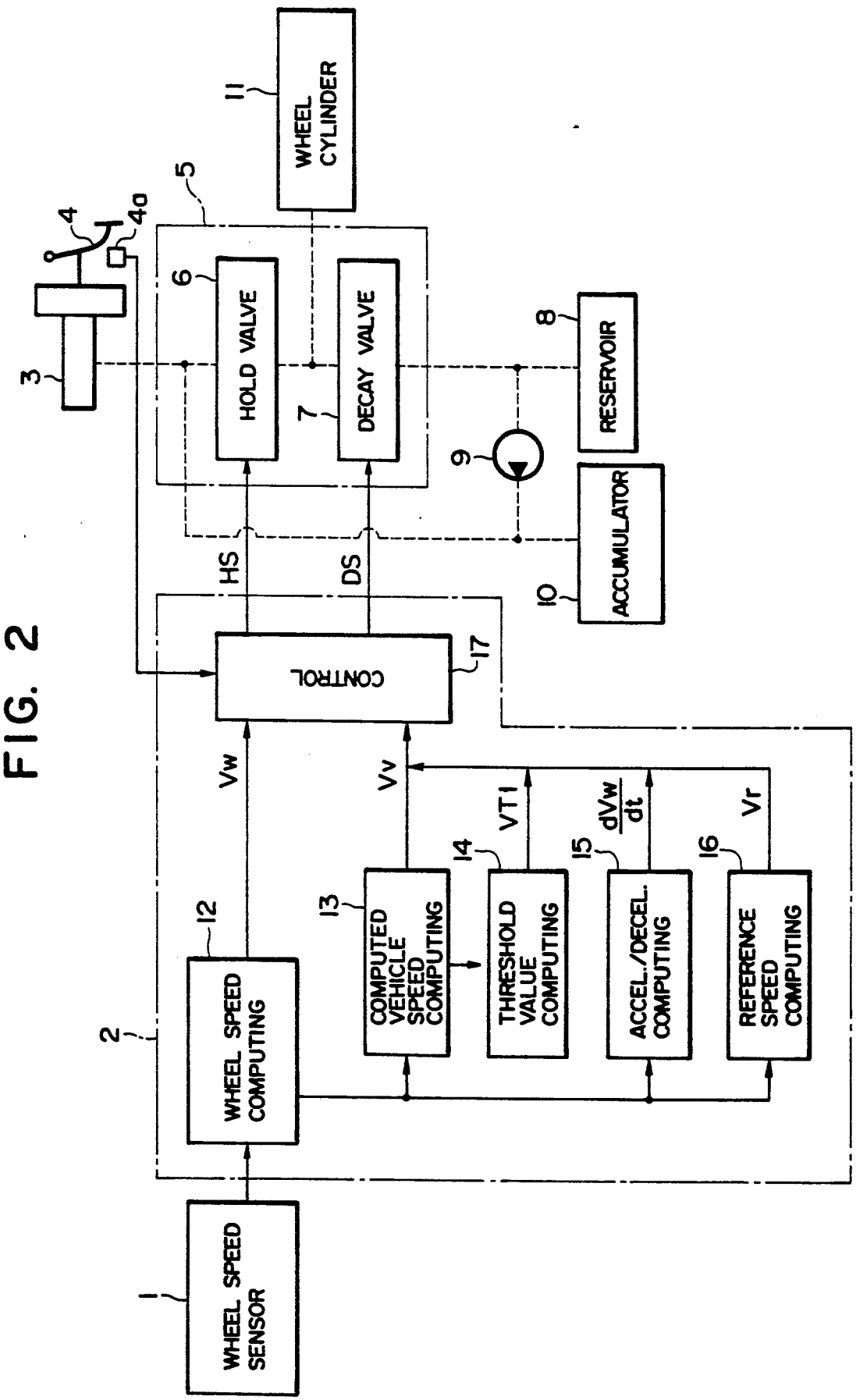
FIG. 2 is a block diagram showing the anti-lock control system according to an embodiment of the present invention.

FIG. 2 is a block diagram of the anti-lock control system according to an embodiment of the present invention.

Signals derived from wheel speed sensors 1 associated with four wheels of the motor vehicle respectively are passed to a control unit 2 comprising microcomputers. Modulator 5 is provided between a master cylinder 3 actuated in response to depression of a brake pedal 4 and a wheel cylinder 11 associated with a respective wheel. The modulator 5 comprises a hold valve 6 which may be a normally open electromagnetic valve, and a decay valve 7 which may be a normally closed electromagnetic valve. Brake liquid which is pumped up from a reservoir 8 by means of a pump 9 is stored in an accumulator 10. Brake switch 4a is turned on in response to the brake pedal 4 being depressed.

The aforementioned control unit 2 comprises speed computing means 12, computed vehicle speed computing means 13, and threshold value computing means 14. The speed computing means 12 is adapted to compute a respective wheel speed Vw from output of a respective one of the wheel speed sensors 1. The computed vehicle speed computing means 13 is arranged to select the highest one of the four wheel speeds and compute the computed vehicle speed by limiting the acceleration and deceleration of the selected highest wheel speed within a range of ±1 G. The threshold value computing means 14 is arranged to compute a threshold speed VT1 which follows the computed vehicle speed Vv with a predetermined speed difference $\Delta V1$ (where VT1=Vv−$\Delta V1$).

The control unit 2 further comprises acceleration/deceleration computing means 15 for computing the acceleration and deceleration dVw/dt of the wheel speed Vw; reference speed computing means 16; and control means 17. The reference speed computing means 16 is arranged to compute a reference speed Vr in such a manner that when the deceleration (negative acceleration) dVw/dt of the wheel speed Vw reaches a predetermined threshold level, say −1.1 G, the reference speed Vr is caused to linearly decrease with a deceleration gradient −1.1 G from a speed (=Vw−$\Delta V$) equal to the current wheel speed Vw minus a predetermined amount $\Delta V$. The control means 17 is arranged to on-off control the hold valve 6 and decay valve 7 incorporated in the modulator 5 on the basis of the outputs of the means 12 to 16, thereby effecting buildup, holding and reduction of the brake hydraulic pressure in the wheel cylinder 11.

Figure 3:
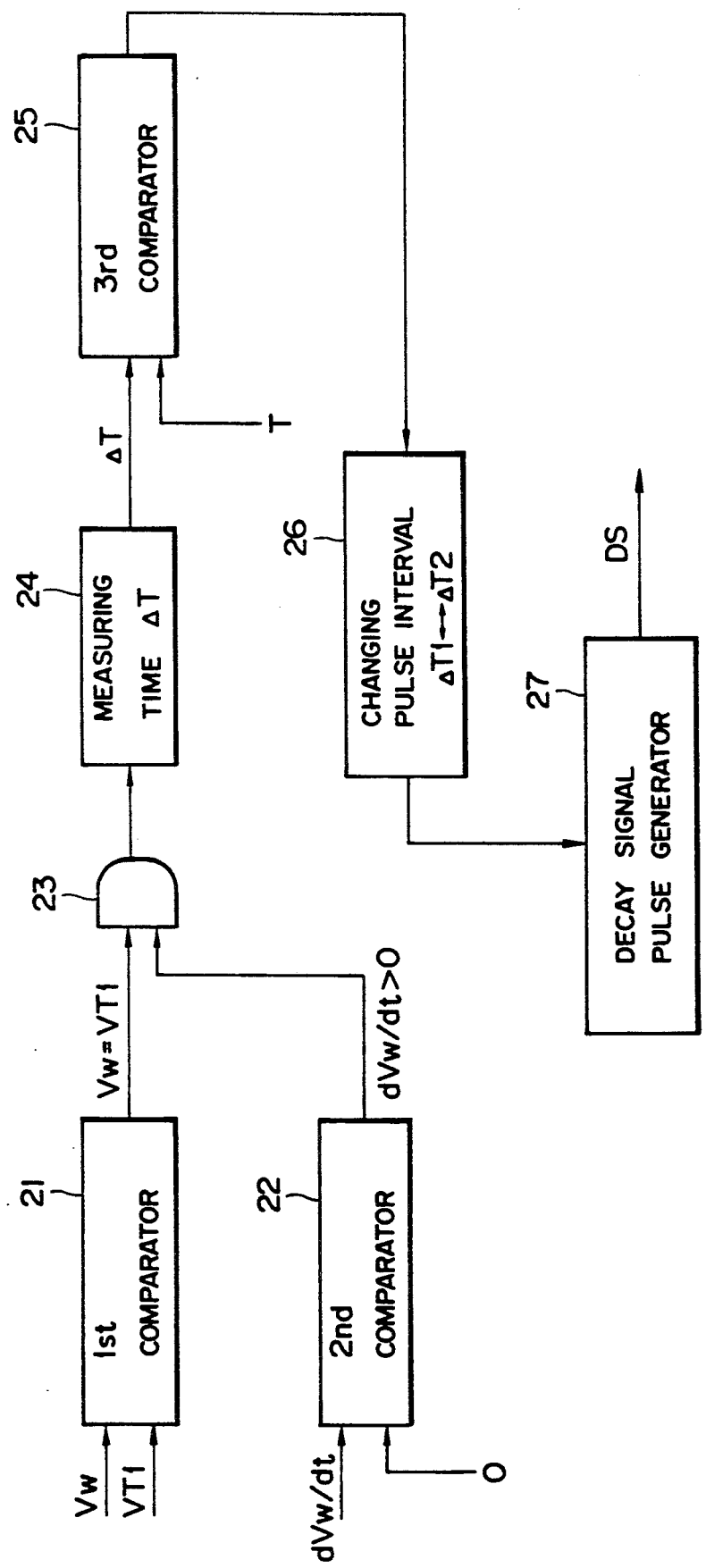
FIG. 3 illustrates the functions of control means provided in the anti-lock control system shown in FIG. 2.

FIG. 3 is a block diagram illustrating those ones of the functions of the control means 17 which are related to the present invention.

Wheel speed Vw is compared with the threshold value VT1 (=Vv−ΔV1) in a first comparator 21; when Vw=VT1, the first comparator 21 provides an output signal. At the same time, derivative dVw/dt of the wheel speed Vw which is derived from the means 15 is compared with zero in a second comparator 22 to determine whether the derivative dVw/dt is positive or negative; when dVw/dt>0, i.e., when the wheel speed Vw is increasing, the second comparator 22 provides an output signal. The two output signals are passed to an AND gate 23 to detect a time point when the increasing wheel speed Vw crosses the threshold value VT1. Timer 24 measures the length of the time period ΔT from the time point when the increasing wheel speed Vw crossed the threshold value VT1 to a time point when the increasing wheel speed Vw crosses the threshold value VT1 again. The time period ΔT is provided to a third comparator 25 to be compared with a predetermined time period T; when ΔT≦T, the third comparator 25 provides a rough-road judgment signal to pulse interval changing means 26.

Figure 4:
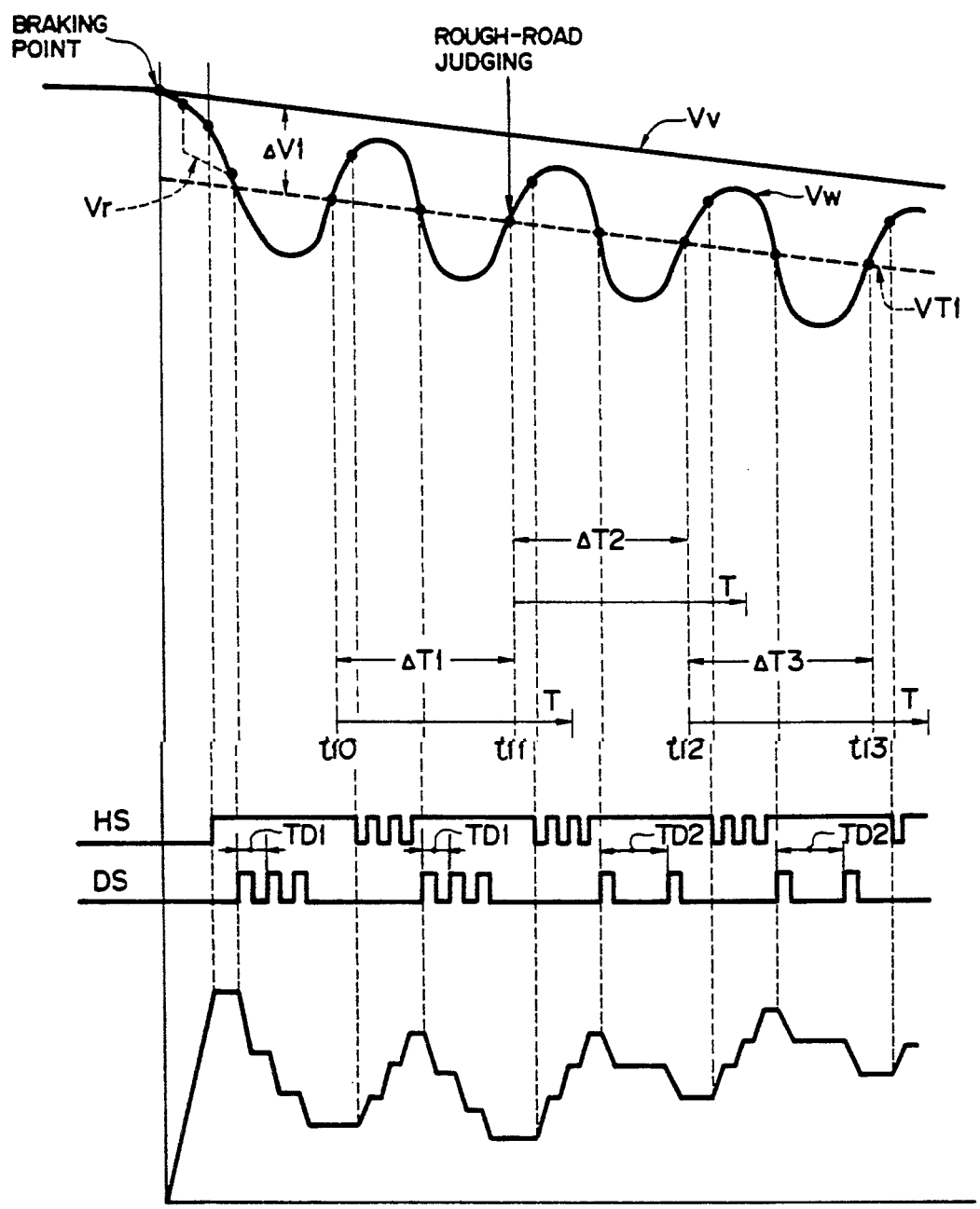
FIG. 4 is a timing chart useful for explaining the rough-road judging operation which is performed in the anti-lock control system of FIG. 2.

Decay signal DS which the control means 17 of FIG. 2 provides to the decay valve, is a pulse signal having a predetermined pulse interval as shown in FIG. 4 which will be explained hereinafter. While the brake hydraulic pressure Pw is being reduced, this pulse signal causes the decay valve 7 to be turned on and off mincingly, i.e., with relatively short intervals so that the reduction of the brake hydraulic pressure ∼Pw is effected in a step-like fashion. To this end, the control means 17 includes a pulse signal generator 27 as shown in FIG. 3. The pulse signal generator 27 is arranged such that the pulse interval of the pulse signal derived therefrom changed between a first predetermined pulse interval TD1 and a second predetermined pulse interval TD2 longer than the first predetermined pulse interval TD1. Normally, the pulse signal generator 27 generates decay signal DS with the first pulse interval TD1; and when the pulse interval changing means 26 provides an output in response to rough-road judgment signal, the pulse signal generator 27 is switched to generate decay signal with the second pulse interval TD2 in response to the output of the pulse interval changing means 26.

FIG. 4 is a timing chart useful for explaining the rough-road judging and processing procedures which are executed in the anti-lock control system of the present invention. In FIG. 4, from a time point t10 onward when increasing wheel speed Vw goes above a threshold value VT1 that is set up to follow the computed vehicle speed Vv with a predetermined speed difference ΔV1, the timer means 24 starts to measure time. More specifically, measurement is first made of the time period ΔT1 from the time point t10 to a time point t11 when the wheel speed Vw, while increasing after having passed high-peak and low-peak points, again passes the threshold level VT1. Likewise, measurement is made in succession of the time period ΔT2 from the time point t11 to t12, the time period ΔT3 from the time point t12 to t13, . . . ; and these time periods ΔT1, ΔT2, ΔT3, . . . are compared with predetermined time period T in the third comparator 25 of FIG. 3. Assuming that one of these measured time periods is ΔT, if ΔT≦T, then judgment is made such that the vehicle is running on a rough road.

Meanwhile, because of the decay signal DS being a pulse signal derived from the pulse signal generator 26 and having a predetermined pulse interval, the decay valve 7 is turned on and off in response thereto mincingly, i.e., with relatively short intervals, as the result of which the brake hydraulic pressure Pw, when reduced, is caused to decrease step-wise. Thus, when the pulse width is constant, the pressure reduction gradient depends on the pulse interval in such a manner that the shorter the pulse interval, the higher becomes the pressure reduction gradient, and the longer the pulse interval, the lower becomes the pressure reduction gradient. In this embodiment, when rough-road judgment is not effected, i.e., for a non-rough road, the pulse interval of the decay signal DS is set at TD1, and when rough-road judgment is effected, i.e., for a rough road, the pulse interval of the decay signal is changed to TD2 which is longer than the aforementioned TD1. Thus, when rough-road judgment is effected, the brake hydraulic pressure Pw is reduced with a lower pressure reduction gradient than that for a non-rough road so that excessive reduction of the brake hydraulic pressure Pw is avoided.

Figure 5:
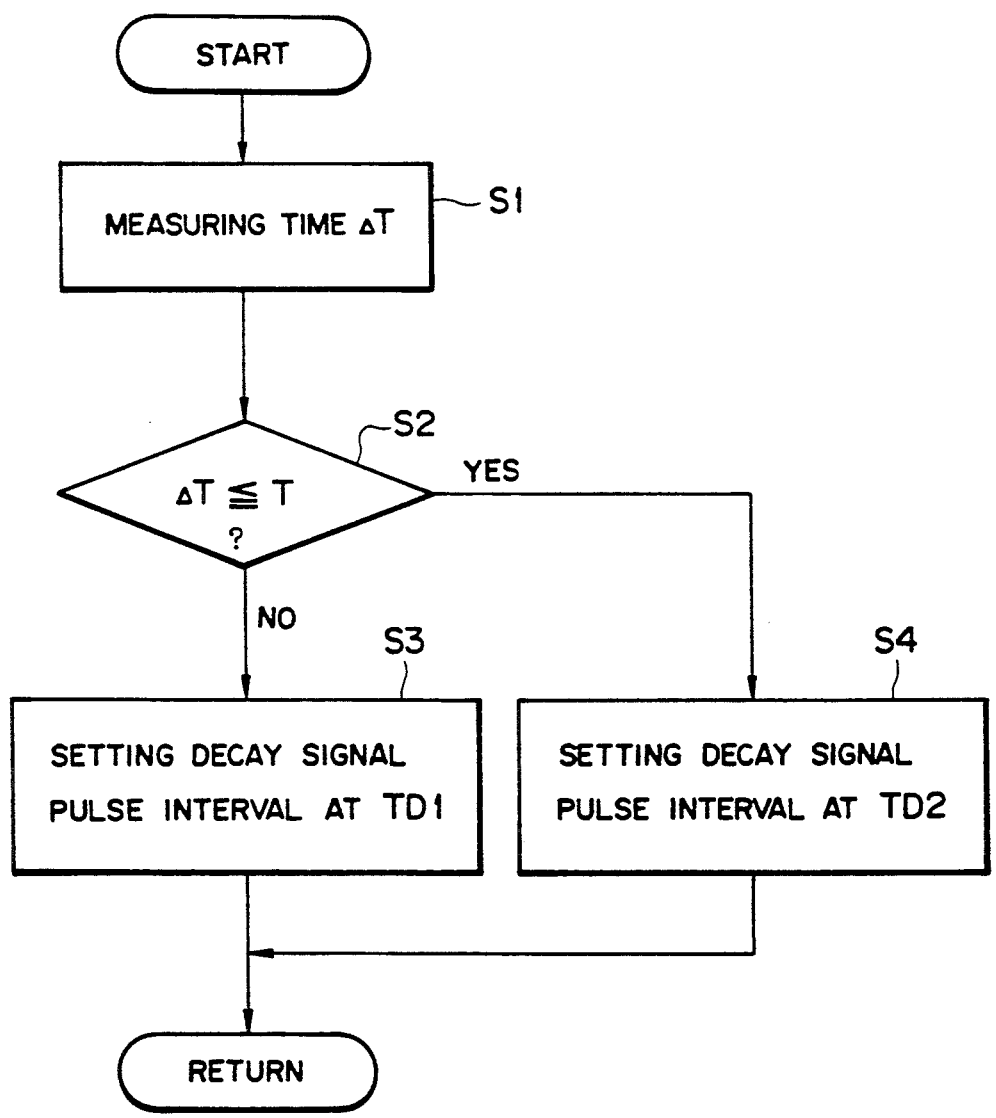
FIG. 5 is a flow chart useful for explaining rough-road coping control routine adopted in the anti-lock control system of FIG. 2.

FIG. 5 is a flow chart showing rough-road coping control routine executed by the control means 17 of FIG. 2.

First, at step S1, the time period ΔT (i.e., ΔT1, ΔT2, ΔT3, . . . ) from a time point when the wheel speed Vw as increasing passes the threshold value VT1 to a time point when the wheel speed Vw as increasing again passes the threshold value VT1, is measured by the counter means 24 of FIG. 3. At step S2, the time period ΔT thus measured is compared with the predetermined time period T in the third comparator means 25. If the time period ΔT is longer than the predetermined time period T, i.e., if ΔT>T, then the result of the judgment made at the step S" will be "NO", and thus at the next step S3, the pulse interval of decay signal DS derived from the pulse signal generator 26 will be set at TD1. On the other hand, if the time period ΔT is equal to or shorter than the predetermined time period T, i.e., ΔT≦T, the result of the judgment made at the step S2 will be "YES", so that judgment that the motor vehicle is running on a rough road, will be made and then the process proceeds to step S4 where the pulse interval of the decay signal DS will be set at TD2 longer than TD1. It is to be particularly noted that according to the present invention, when rough-road judgment is made, the pulse interval of the decay signal DS is changed to the longer value TD2 so that the reduction gradient of the brake hydraulic pressure Pw becomes lower than that for the case where the motor vehicle is running on a non-rough road, thereby restricting the amount of reduction of the brake hydraulic pressure Pw.

In the foregoing embodiments of this invention, the time period from a time point when the wheel speed Vw as increasing passes the threshold value VT1 to a time point when the wheel speed Vw as increasing again passes the threshold value VT1, was measured by counter means 24. Instead of this, it is also possible that the time period from a time point when wheel speed Vw as decreasing passes the threshold value VT1 to a time point when the wheel speed Vw as decreasing passes the threshold value again, may be measured, and the time period thus measured may be compared with predetermined time period. In such a case, the comparator means 22 may be arranged to provide an output to AND gate 23 when $dVw/dt < 0$.

While the present invention has been illustrated and described with respect to specific embodiments thereof, it is to be understood that the present invention is by no means limited thereto but encompasses all changes and modifications which will become possible within the scope of the appended claims.

I claim:

1. An anti-lock control system for a motor vehicle wherein brake hydraulic pressure is increased, held or reduced based on changes in wheel speeds when braked, thereby preventing the wheels from being locked, said system comprising:

rough-road judging means (21, 22, 23, 24, 25) for making judgment as to whether or not the motor vehicle is running on a rough road;

means (26, 27) adapted when said rough-road judging means (21, 22, 23, 24, 25) judges that the motor vehicle is running on a rough road, to make, in response thereto, reduction gradient of the brake hydraulic pressure lower than that for a case where rough-road judgment is not made by said rough-road judging means (21, 22, 23, 24, 25), means (13) for computing a computed vehicle speed Vv proximate to the actual vehicle speed on the basis of four wheel speeds representing rotating speeds of the four wheels of the motor vehicle respectively; and threshold value computing means (14) for computing a threshold value VT1 which follows the computed vehicle speed Vv with a predetermined speed difference $\Delta V1$ (VT1=Vv$-\Delta V1$).

2. An anti-lock control system according to claim 1, wherein the computation of said computed vehicle speed by said computed vehicle speed computing means (13) is effected by selecting the highest one of said four wheel speeds and limiting acceleration and deceleration derived from said highest wheel speed in a predetermined range.

3. An anti-lock control system according to claim 2, wherein said predetermined range in which said acceleration or deceleration is limited is from +1G to −1G.

4. An anti-lock control system for a motor vehicle wherein brake hydraulic pressure is increased, held or reduced based on changes in wheel speeds when braked, thereby preventing the wheels from being locked, said system comprising:

rough-road judging means (21, 22, 23, 24, 25) for making judgment as to whether or not the motor vehicle is running on a rough road;

means (26, 27) adapted when said rough-road judging means (21, 22, 23, 24, 25) judges that the motor vehicle is running on a rough road, to make, in response thereto, reduction gradient of the brake hydraulic pressure lower than that for a case where rough-road judgment is not made by said rough-road judging means (21, 22, 23, 24, 25), means (13) for computing a computed vehicle speed Vv proximate to the actual vehicle speed on the basis of four wheel speeds representing rotating speeds of the four wheels of the motor vehicle respectively; and threshold value computing means (14) for computing a threshold value VT1 which follows the computed vehicle speed Vv with a predetermined speed difference $\Delta V1$ (VT1=Vv$-\Delta V1$);

said rough-road judging means (21, 22, 23, 24, 25) including:

means (21, 22, 23) for detecting a time point when the wheel speed as increasing passes the said threshold value;

time measuring means (24) for measuring time period $\Delta T$ between two adjacent time points detected by said detecting means (21, 22, 23); and means (25) for comparing the time period $\Delta T$ measured by the time measuring means (24) with a predetermined time period T, said means (25) being adapted, when $\Delta T$ becomes equal to or shorter than the predetermined time period T, to provide a rough-road judgment signal;

said rough-road judging means (21, 22, 23, 24, 25) further including:

means (21, 22, 23) for detecting a time point when the wheel speed as decreasing passes the said threshold value;

time measuring means (24) for measuring time period $\Delta T$ between two adjacent time points detected by said detecting means (21, 22, 23); and means (25) for comparing the time period $\Delta T$ measured by the time measuring means (24) with a predetermined time period T, said means (25) being adapted, when $\Delta T$ becomes equal to or shorter than the predetermined time period T, to provide a rough-road judgment signal.

5. An anti-lock control system according to claim 1 or 4, wherein reduction of the brake hydraulic pressure is effected because of decay valve being opened and closed with relatively short intervals by decay signal consisting of pulse signal; and said means (26, 27) is arranged to make said reduction gradient lower by increasing pulse interval of said decay signal.

6. An anti-lock control system according to claim 4, wherein the computation of said computed wheel speed by said computed vehicle speed computing means (13) is effected by selecting the highest one of said four wheel speeds and limiting acceleration and deceleration derived from said highest wheel speed in a predetermined range.

7. An anti-lock control system according to claim 6, wherein said predetermined range in which said acceleration or deceleration is limited is from +1G to −1G.

* * * * *